United States Patent Office 3,186,992
Patented June 1, 1965

3,186,992
DERIVATIVES OF 4-OXO-6-QUINAZOLINE-
SULFONAMIDE
Milton L. Hoefle, Ann Arbor, Mich., assignor to Parke,
Davis & Company, Detroit, Mich., a corporation of
Michigan
No Drawing. Filed May 2, 1963, Ser. No. 277,484
3 Claims. (Cl. 260—256.5)

The present invention relates to novel heterocyclic sulfonamide compounds and to methods for their production. More particularly, it relates to 7-chloro-3,4-dihydro-3-hydroxy-4-oxo-6-quinazolinesulfonamide, having the formula

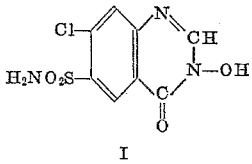

I and alkali metal salts thereof; and to 7-chloro-1,2,3,4-tetrahydro-3-hydroxy-4-oxo - 6 - quinazolinesulfonamide, having the formula

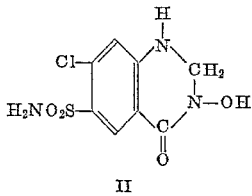

II and alkali metal salts thereof.

In accordance with the invention, 7-chloro-3,4-dihydro-3-hydroxy-4-oxo-6-quinazolinesulfonamide, the compound of Formula I, is prepared by reaction of an anthranilic acid ester of the formula

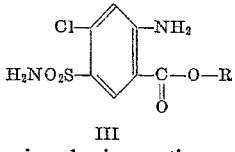

III with hydroxylamine in a basic reaction medium, followed by reaction of the intermediate hydroxamic acid of formula

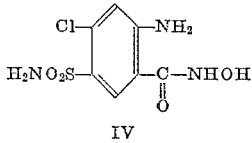

IV with formic acid. In Formula III, R represents lower alkyl or cyanomethyl. The preferred R group is cyanomethyl. The first stage of this process, namely, the formation of the hydroxamic acid of Formula IV, may be carried out in a lower aliphatic alcoholic solvent, such as methanol, ethanol, or isopropanol, or in an aqueous mixture of such alcohol. The preferred solvent is aqueous methanol. The temperature and duration of this first stage may be varied over a wide range; a temperature in the range of 0–50° C. and a duration of 24–120 hours are normally employed. Preferred conditions are a temperature in the range of 20–30° C. for a period of 60–80 hours. It is preferable to employ an excess of both hydroxylamine and base. The hydroxylamine may be added in the form of one of its acid-addition salts, such as the hydrochloride, in which case sufficient base is added to neutralize the salt and to render the reaction medium basic. A suitable base is an alkali metal hydroxide, such as sodium hydroxide. The hydroxamic acid of Formula IV, which is the product of the first stage, is normally not isolated.

The second stage of the above process, namely, the formation of the quinazoline compound of Formula I, is carried out in a large excess of formic acid. Various aqueous mixtures of formic acid may be used; it is preferable, however, to use 98% formic acid. A temperature in the range of 70–105° C. for a period of 1–5 hours may be used; for best results this second stage is carried out at the reflux temperature for a period of 2 hours.

The anthranilic acid ester compounds of Formula III, which are the starting materials employed in the foregoing process, are prepared by reacting 4-chloro-5-sulfamoyl-anthranilic acid of the formula

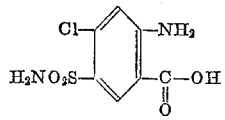

V with a compound of the formula

R—X where R has the same meaning as given above and X represents a halogen atom or the hydroxyl radical.

Also in accordance with the invention, 7-chloro-1,2,3,4-tetrahydro-3-hydroxy-4-oxo-6-quinazolinesulfonamide, the compound of Formula II, and alkali metal salts thereof are prepared by the reaction of 7-chloro-3,4-dihydro-3-hydroxy-4-oxo-6-quinazolinesulfonamide, the compound of Formula I, with a complex metal hydride reducing agent in an inert, anhydrous organic solvent medium, followed by decomposition of the reaction mixture with an aqueous medium. The preferred reducing agent is a combination of aluminum chloride and sodium borohydride. Other borohydrides, such as potassium borohydride and lithium borohydride may also be used in place of sodium borohydride. It is not desirable to employ lithium aluminum hydride in this reduction procedure. Solvents which may be used include tetrahydrofuran, dibutyl ether, 1,2-dimethoxy-ethane, and diethylene glycol dimethyl ether; the preferred solvent is diethylene glycol dimethyl ether. A temperature in the range of 50–100° C. for a period of ½ to 4 hours may be employed. The preferred conditions are a temperature in the range of 60–85° C. for a period of 1–2 hours. It is preferable to employ equimolar amounts of aluminum chloride and the dihydroquinazoline. A considerable excess of the borohydride reactant is normally used. Following reaction with the reducing agent, the reaction mixture is hydrolyzed with an aqueous medium, such as water, dilute aqueous inorganic acids or bases, or other media containing water.

The compounds of the invention, which in their acid form have Formulas I and II, form non-toxic alkali metal salts upon treatment with strong alkali metal bases, such as sodium hydroxide and potassium hydroxide. Such salts are equivalent to the parent compounds for purposes of the invention.

The compounds of the invention are useful pharmacological agents. They are potent diuretic agents that produce a marked increase in cation and chloride ion excretion, as well as in urine volume. They are active upon oral administration.

The invention is illustrated by the following examples.

Example 1

To a chilled and stirred solution of 16.0 g. of sodium hydroxide in 100 ml. of water is added 13.9 g. of hydroxylamine hydrochloride. The resulting basic solution of hydroxylamine is added with stirring to a solution of 19.0 g. of cyanomethyl 4-chloro-5-sulfamoylanthranilate in 150 ml. of methanol, and the resulting solution is kept at 25° C. for 3 days. The solution is then concentrated under reduced pressure to a volume of about 50 ml. and acidified with concentrated hydrochloric acid. The precipitated 4-chloro-5-sulfamoylanthranilic acid is removed by filtration, and the filtrate is evaporated to dryness under reduced pressure. The residue is dissolved in 100 ml. of 98% formic acid, the resulting solution is heated under reflux for 2 hours, and is evaporated to dryness under reduced pressure. The residue is stirred with 50 ml. of hot water and the 7-chloro-3,4-dihydro-3-hydroxy-4-oxo-6-quinazoline-sulfonamide obtained is isolated by filtration and crystallized from 50% aqueous ethanol; M.P. 288° C.

In the foregoing procedure, the same product is obtained when 17.5 g. of methyl 4-chloro-5-sulfamoylanthranilate is used in place of the cyanomethyl 4-chloro-5-sulfamoylanthranilate.

The sodium salt is obtained by dissolving 2.7 g. of 7-chloro-3,4-dihydro-3-hydroxy-4-oxo-6 - quinazolinesulfonamide together with 0.4 g. of sodium hydroxide in 100 ml. of 95% ethanol, concentrating the solution to near-dryness under reduced pressure, and isolating the solid salt by filtration.

The cyanomethyl 4-chloro-5-sulfamoylanthranilate used as a starting material in the foregoing procedure is prepared as follows: A mixture of 6.75 g. of 4-chloro-5-sulfamoylanthranilic acid, 36 g. of chloroacetonitrile and 400 ml. of acetone is stirred at 25° C. while 57 ml. of triethylamine is added dropwise. The resulting solution is stirred and heated under reflux for 24 hours, cooled and filtered to remove triethylamine hydrochloride. The filtrate is evaporated to dryness under reduced pressure, the residue is triturated with 200 ml. of water, and the cyanomethyl 4-chloro-5-sulfamoylanthranilate obtained is isolated by filtration, dried, and used without further purification. A sample crystallized from 50% aqueous ethanol had M.P. 212–213° C.

The methyl 4-chloro-5-sulfamoylanthranilate used as starting material in the foregoing procedure is prepared in the following manner:

A solution of 12.5 g. of 4-chloro-5-sulfamoylanthranilic acid in 100 ml. of absolute methanol is saturated with dry hydrogen chloride gas and kept at room temperature for 12 hours. The solution is then heated under reflux for one hour, concentrated under reduced pressure, and 25 ml. of water is added to the residue. The mixture is made basic (to pH 8) with concentrated ammonium hydroxide, and the precipitated methyl 4-chloro-5-sulfamoylanthranilate is isolated by filtration, dried, and crystallized from aqueous methanol; M.P. 226–227° C.

*Example 2*

To a stirred solution of 1.03 g. of aluminum chloride in 250 ml. of diethylene glycol dimethyl ether is added 2.2 g. of 7-chloro-3,4-dihydro-3-hydroxy-4-oxo-6-quinazolinesulfonamide. The resulting solution is warmed to 60° C., a solution of 1.4 g. of sodium borohydride in 70 ml. of diethyleneglycol dimethyl ether is added dropwise, and the reaction mixture is stirred and heated at 75° C. for one hour and at 85° C. for 15 minutes. The solution is cooled, 40 ml. of water is added dropwise, and the aqueous solution is acidified by the addition of 12 ml. of 2 N hydrochloric acid. The acidic solution is evaporated to dryness under reduced pressure, the residue is triturated with 20 ml. of cold water, and the 7-chloro-1,2,3,4-tetrahydro-3-hydroxy-4-oxo-6-quinazolinesulfonamide obtained is isolated by filtration and dried; M.P. 246–247° after crystallization from 95% ethanol and recrystallization from 50% aqueous acetone.

In the foregoing procedure the same product is obtained when 1.0 g. of lithium borohydride is substituted for the sodium borohydride.

The potassium salt is obtained by dissolving 2.7 g. of 7-chloro-1,2,3,4-tetrahydro-3-hydroxy - 4 - oxo - 6 - quinazolinesulfonamide together with 0.6 g. of potassium hydroxide in 100 ml. of 95% ethanol, concentrating the solution to near-dryness under reduced pressure, and isolating the solid salt by filtration.

I claim:

1. A member of the class constituting of 7-chloro-3,4-dihydro-3-hydroxy-4 - oxo - 6 - quinazolinesulfonamide, 7-chloro-1,2,3,4-tetrahydro-3-hydroxy-4-oxo-6 - quinazolinesulfonamide, and alkali metal salts thereof.

2. 7-chloro-3,4-dihydro - 3 - hydroxy - 4 - oxo - 6 - quinazolinesulfonamide.

3. 7-chloro-1,2,3,4 - tetrahydro - 3 - hydroxy - 4 - oxo-6-quinazolinesulfonamide.

References Cited by the Examiner

UNITED STATES PATENTS

| | | | |
|---|---|---|---|
| 2,952,680 | 9/60 | Novello | 260—256.5 |
| 2,976,289 | 3/61 | Cohen et al. | 260—256.5 |

OTHER REFERENCES

Migrdichian: Organic Synthesis, Reinhold Publishing Co., New York, 1957, page 401.

IRVING MARCUS, *Primary Examiner.*

NICHOLAS S. RIZZO, *Examiner.*